(12) United States Patent
Aldana

(10) Patent No.: US 8,577,302 B2
(45) Date of Patent: Nov. 5, 2013

(54) METHOD AND SYSTEM FOR FEEDBACK OF ANTENNA BEAMFORMING

(75) Inventor: Carlos Aldana, Sunnyvale, CA (US)

(73) Assignee: Broadcom Corporation, Irvine, CA (US)

(*) Notice: Subject to any disclaimer, the term of this patent is extended or adjusted under 35 U.S.C. 154(b) by 1743 days.

(21) Appl. No.: 11/342,427

(22) Filed: Jan. 30, 2006

(65) Prior Publication Data
US 2007/0117590 A1 May 24, 2007

Related U.S. Application Data

(60) Provisional application No. 60/738,504, filed on Nov. 21, 2005.

(51) Int. Cl.
| H04B 7/00 | (2006.01) |
| H04B 7/14 | (2006.01) |
| H04B 15/00 | (2006.01) |
| H04M 1/00 | (2006.01) |
| H01Q 3/00 | (2006.01) |

(52) U.S. Cl.
USPC ............ 455/69; 455/25; 455/504; 455/562.1; 343/757

(58) Field of Classification Search
USPC ........... 455/25, 13.3, 562.1, 69, 504; 343/757
See application file for complete search history.

(56) References Cited

U.S. PATENT DOCUMENTS

| 7,050,397 B2 * | 5/2006 | Cheng et al. ................... 370/235 |
| 2005/0287978 A1 * | 12/2005 | Maltsev et al. ................ 455/403 |
| 2008/0247370 A1 * | 10/2008 | Gu et al. ....................... 370/338 |

* cited by examiner

Primary Examiner — Vladimir Magloire
Assistant Examiner — Michael Mapa
(74) Attorney, Agent, or Firm — Garlick & Markison; Holly L. Rudnick

(57) ABSTRACT

The disclosed systems and methods achieve improved communication by periodically sending sounding packets from a transmitter; feeding back, from a receiver, the change in beamforming estimation according to reception of the sounding packets; and utilizing the change in beamforming estimation to produce transmitter beamforming.

20 Claims, 2 Drawing Sheets

METHOD AND SYSTEM FOR FEEDBACK OF ANTENNA BEAMFORMING

RELATED APPLICATIONS

This application claims priority to "METHOD AND SYSTEM FOR ANTENNA BEAMFORMING", Provisional Application for U.S. Patent, Ser. No. 60/738,504, filed Nov. 21, 2005, by Carlos Aldana, which is incorporated by reference herein for all purposes.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Multiple antennas can be used to i) increase the antenna gain by beamforming; ii) provide diversity gain through some form of antenna combining; iii) increase the data rate by spatial multiplexing; and iv) suppress spatial interference by null steering. However, a system with multiple antennas may be unable to take advantage of all of these benefits if the system cannot accurately estimate and track a wireless communications channel.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for antenna beamforming, substantially as shown in and/or described in connection with at least one of the figures, as set forth more completely in the claims. Advantages, aspects and novel features of the present invention, as well as details of an illustrated embodiment thereof, will be more fully understood from the following description and drawings.

DETAILED DESCRIPTION OF THE INVENTION

Aspects of the present invention relate to antenna beamforming and more specifically, to steady state parameter feedback systems and methods. Although the following description may refer to particular wireless communication standards, many other standards may also use these systems and methods.

Multiple-input multiple-output (MIMO) techniques take advantage of multiple transmit and/or receive antennas for communication. For example, the UMTS/W-CDMA standard specifies transmit diversity, and the 802.11n wireless local area network (WLAN) standard specifies spatial division multiplex. Spatial multiplexing and spatial diversity are two categories of MIMO systems.

Spatial division multiplexing (SDM) occurs when several streams are transmitted simultaneously from the multiple transmit antennas to multiple receive antennas to boost the spectral efficiency of the transmission. SDM may be fully exploited if the number of antennas is, at both sides, equal to or greater than the number of parallel streams.

Spatial diversity occurs when the same symbols are transmitted on different transmit antennas or received by several receive antennas. Diversity combining may be a form of beamforming where the signal transmitted or received by the antenna array may be weighted in phase and in amplitude.

Spatial processing may be combined with orthogonal frequency division multiplexing (OFDM). OFDM multi-carrier transmission is used in many standards (e.g. WiFi 802.11 and WiMAX 802.16). The spatial processing of the current invention may be applied per sub-carrier (frequency-domain processing), thereby decoupling the spatial processing from the equalization of the frequency-selective channel and leading to low complexity solutions. MIMO processing can be performed at either the transmitter or the receiver side, or at both sides.

Figure 1:
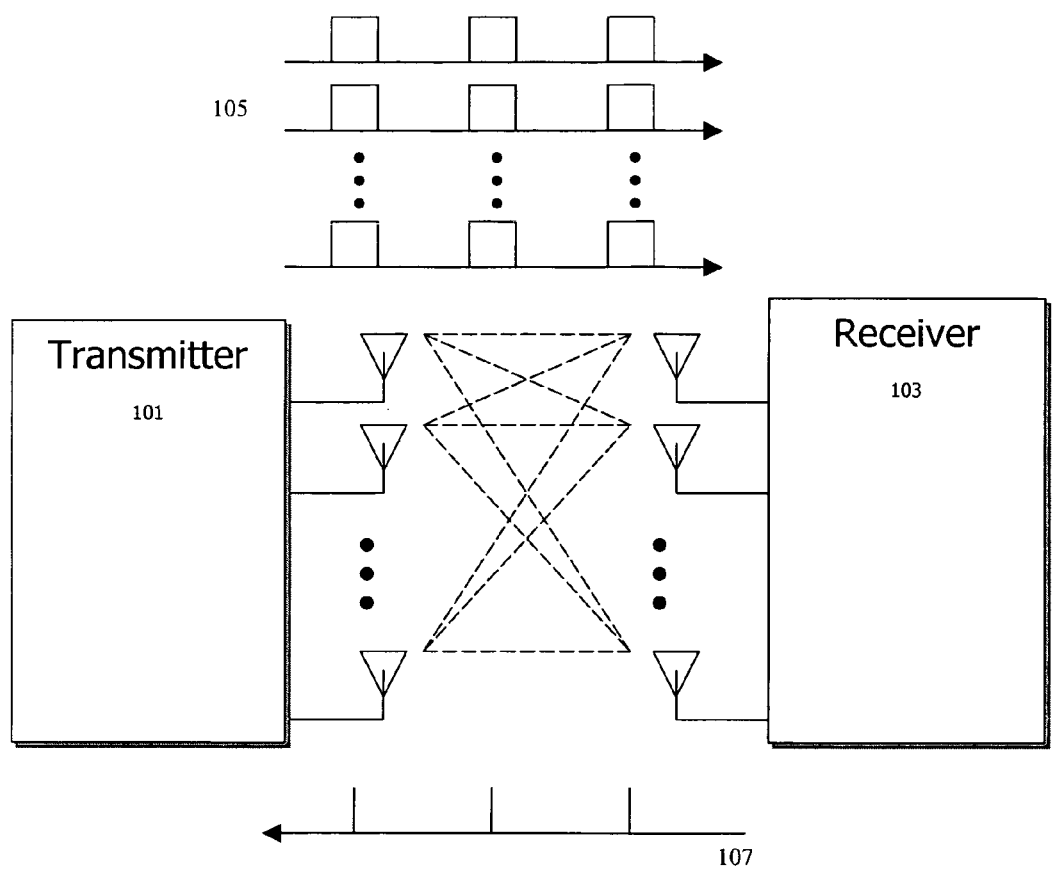
FIG. 1 is an illustration of an exemplary system for antenna beamforming in accordance with an embodiment of the present invention.

FIG. 1 is an illustration of an exemplary system 100 for antenna beamforming in accordance with an embodiment of the present invention. The system 100 comprises a transmitter 101 and a receiver 103. The transmitter 101 comprises Ntx antennas and the receiver 103 comprises Nrx antennas.

The transmitter 101 sends Nss streams 105 of sounding packets. A stream of sounding packets is a periodic transmission of a sequence known by the receiver 103. The periodicity may be, for example, at a rate of 1 kHz.

Upon receiving a first plurality of sounding packets at time T, the receiver 103 may generate a channel estimate matrix H(T), from which a beamforming estimate matrix V(T) may be acquired. The beamforming estimate matrix V(T) contains Ntx rows and Nss columns. Alternatively, the receiver 103 may generate a channel estimate matrix H(T) with contains Nrx rows and Ntx columns. The relationship between H and V is H=U×S×V', where V' is the complex conjugate transpose of V, S with dimensions Nss×Nss, where Nss is the number of streams, and U with dimensions Nrx×Nss may be used for receiver beamforming.

Upon receiving a second plurality of sounding packets at time T+ΔT, the receiver 103 may generate a beamforming estimate matrix V(T+ΔT). The receiver 103 generating a feedback signal ΔV=V(T+ΔT)−V(T). The feedback signal is used to perform transmit beamforming. The feedback signal is sent to the transmitting station and will usually be able to be represented by a smaller number of bits. Alternatively, the beamforming estimate matrix V can be a function of an angle V=f(Θ), and the change in the angle (ΔΘ) can be used as feedback, where ΔΘ=Θ(T+ΔT)−Θ(T). For example, a 2×2 beamforming matrix may be represented as:

$$\begin{bmatrix} \cos(\Theta) & \sin(\Theta) \\ -\sin(\Theta) & \cos(\Theta) \end{bmatrix}$$

Each element of the 2×2 beamforming matrix may be quantized. Alternatively, the angle Θ may be quantized, thereby representing the 2×2 beamforming matrix by a single parameter. Each beamforming matrix may also be represented by a set of angles, denoted by Θ.

When the first beamforming estimate and the second beamforming estimate are substantially the same, the feedback signal may not be sent to the transmitter. Alternatively, when the first beamforming estimate and the second beamforming estimate are substantially the same, the feedback signal may be a single bit indicating that the first beamforming estimate and the second beamforming estimate are substantially the same.

Figure 2:
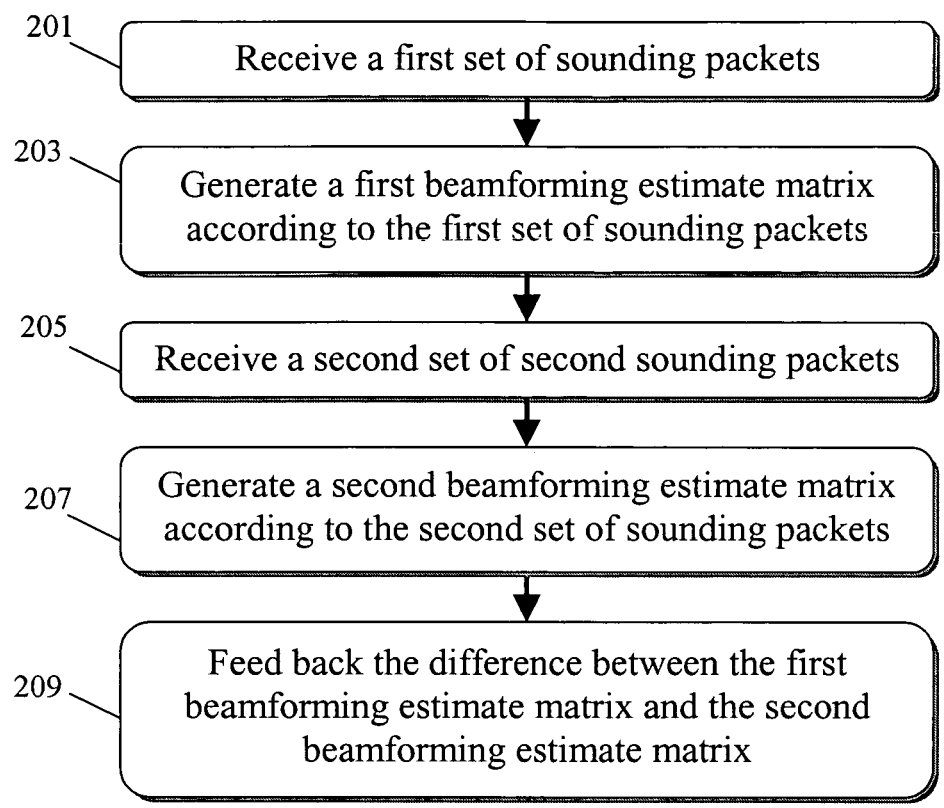
FIG. 2 is a flowchart illustrating an exemplary method for antenna beamforming in accordance with a representative embodiment of the present invention.

FIG. 2 is a flowchart 200 illustrating an exemplary method for antenna beamforming in accordance with a representative embodiment of the present invention.

A first plurality of sounding packets is received at 201. According to the first set of sounding packets, a first beamforming estimate matrix is generated at 203. A second plurality of sounding packets is received at 205. According to the second set of sounding packets, a second beamforming estimate matrix is generated at 207. The difference between the first beamforming estimate matrix and the second beamforming estimate matrix is fed back at 209 for transmitter beamforming.

The present invention may be realized in hardware, software, or a combination of hardware and software. The present invention may be realized in a centralized fashion in an integrated circuit or in a distributed fashion where different elements are spread across several circuits. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system for improving communication, wherein the system comprises: a transmitter configured to send a first plurality of sounding packets and a second plurality of sounding packets; and a receiver configured to receive the first plurality of sounding packets, receive the second plurality of sounding packets, generate a first beamforming estimate based on the first plurality of sounding packets, generate a second beamforming estimate based on the second plurality of sounding packets, and generate a feedback signal based on the difference between the first beamforming estimate and the second beamforming estimate; wherein the receiver directs beamforming according to the feedback signal; and wherein the feedback signal includes only a single bit when the first beamforming estimate and the second beamforming estimate are substantially the same; wherein the feedback signal includes multiple bits when the first beamforming estimate and the second beamforming estimate differ.

2. The system of claim 1, wherein the feedback signal is indicative of the change in one or more parameters between the first beamforming estimate and the second beamforming estimate.

3. The system of claim 2, wherein the first beamforming estimate and the second beamforming estimate are functions of one or more angles of a sounding packet in the first and second plurality of sounding packets and the the one or more parameters include the one or more angles.

4. The system of claim 1, wherein the first beamforming estimate and the second beamforming estimate are beamforming estimation matrices.

5. The system of claim 1, wherein the receiver is further configured to generate a first channel estimate matrix based on the first plurality of sounding packets and a second channel estimate matrix based on the second plurality of sounding packets.

6. The system of claim 5, wherein the first beamforming estimate is acquired from the first channel estimate matrix and the second beamforming estimate is acquired from the second channel estimate matrix.

7. The system of claim 1, wherein the system is a Multiple-Input Multiple-Output (MIMO) system, the transmitter includes a plurality of transmit antennas and the receiver includes a plurality of receive antennas.

8. The system of claim 7, wherein each of the first plurality of sounding packets and the second plurality of sounding packets includes multiple streams of sounding packets transmitted over the plurality of transmit antennas and received over the plurality of receive antennas.

9. The system of claim 8, wherein each of the multiple streams is a periodic transmission of a sequence of known by the receiver.

10. The system of claim 8, wherein each of the first beamforming estimate and the second beamforming estimate are beamforming estimate matrices having a number of rows corresponding to a number of transmit antennas and a number of columns corresponding to a number of streams.

11. The system of claim 7, wherein each of the first beamforming estimate and the second beamforming estimate are beamforming estimate matrices having a number of rows corresponding to a number of receive antennas and a number of columns corresponding to a number of transmit antennas.

12. The system of claim 1, wherein the first plurality of packets are transmitted at a first time and the second plurality of packets are transmitted at a second time subsequent to the first time.

13. A method for improving communication, wherein the method comprises: receiving a first plurality of sounding packets; generating a first beamforming estimate according to the first plurality of sounding packets; receiving a second plurality of sounding packets; generating a second beamforming estimate according to the second plurality of sounding packets; and generating a feedback signal based on the difference between the first beamforming estimate and the second beamforming estimate; wherein the feedback signal includes only a single bit when the first beamforming estimate and the second beamforming estimate are substantially the same; wherein the feedback signal includes multiple bits when the first beamforming estimate and the second beamforming estimate differ.

14. The method of claim 13, wherein the first beamforming estimate and the second beamforming estimate are in the form of a matrix.

15. The method of claim 13, wherein the feedback signal is based on a difference between one or more angles in the first beamforming estimate and one or more angles in the second beamforming estimate.

16. The method of claim 15, wherein the first beamforming matrix is based on a channel according to the first plurality sounding packets.

17. The method of claim 15, wherein the second beamforming matrix is based on a channel according to the second plurality sounding packets.

18. The method of claim 13, wherein the feedback signal is the change in a beamforming estimation matrix.

19. The method of claim 13, further comprising:
generating a first channel estimate matrix based on the first plurality of sounding packets; and
generating a second channel estimate matrix based on the second plurality of sounding packets;
wherein the first beamforming estimate is acquired from the first channel estimate matrix and the second beamforming estimate is acquired from the second channel estimate matrix.

20. A receiver within a communication system, comprising: a plurality of receive antennas for receiving a first plurality of sounding packets transmitted from a transmitter and receiving a second plurality of sounding packets transmitted from the transmitter; and a processor for generating a first beamforming estimate based on the first plurality of sounding packets, generating a second beamforming estimate based on the second plurality of sounding packets, and generating a feedback signal based on the difference between the first beamforming estimate and the second beamforming estimate; wherein the receiver directs beamforming of the transmitter according to the feedback signal; and wherein the feedback signal includes only a single bit when the first beamforming estimate and the second beamforming estimate are substantially the same; wherein the feedback signal includes multiple bits when the first beamforming estimate and the second beamforming estimate differ.

* * * * *

UNITED STATES PATENT AND TRADEMARK OFFICE
CERTIFICATE OF CORRECTION

PATENT NO.       : 8,577,302 B2                                      Page 1 of 1
APPLICATION NO.  : 11/342427
DATED            : November 5, 2013
INVENTOR(S)      : Carlos Aldana It is certified that error appears in the above-identified patent and that said Letters Patent is hereby corrected as shown below:

In the Claims
Col. 5, Lines 9-10, in claim 16: after "plurality" insert --of--
Col. 5, Line 13, in claim 17: after "plurality" insert --of--

Signed and Sealed this
Twenty-second Day of July, 2014

Michelle K. Lee
*Deputy Director of the United States Patent and Trademark Office*